United States Patent [19]

Peterman et al.

[11] 4,202,178
[45] May 13, 1980

[54] LOW-BOILING LIQUID APPARATUS

[76] Inventors: Paul L. Peterman, Rte. 1, Box 161; S. F. Peterman, Rte. 2, Box 33; Henry D. Waldrep, P.O. Box 372, all of Celina, Tex. 75009

[21] Appl. No.: 918,500

[22] Filed: Jun. 23, 1978

[51] Int. Cl.² ............................ F03G 3/00; F01K 25/00
[52] U.S. Cl. ........................................ 60/675; 60/531
[58] Field of Search ................. 60/531, 675, 641; 417/329, 379

[56] References Cited

U.S. PATENT DOCUMENTS

| 253,868 | 2/1882 | Iske | 60/675 |
|---|---|---|---|
| 378,998 | 3/1888 | Barthel | 60/675 |

Primary Examiner—Allen M. Ostrager
Attorney, Agent, or Firm—Warren H. Kintzinger

[57] ABSTRACT

A thermodynamic motor of the "sea-saw" type employs water tanks into which opposed ones of low-boiling liquid-containing interconnected tanks on a pivot arm are cyclically immersed. Tank water is maintained at a higher-than-ambient temperature level by a primary heat source. Temperature differential between liquid containing tanks is enhanced by a heat exchanger in the interconnection between tanks. The motor drives fluid compressors and further heat exchanging means communicate with the compressors and tank water to transfer heat of compression into the water to further enhance the temperature differential upon which motor operation depends.

14 Claims, 3 Drawing Figures

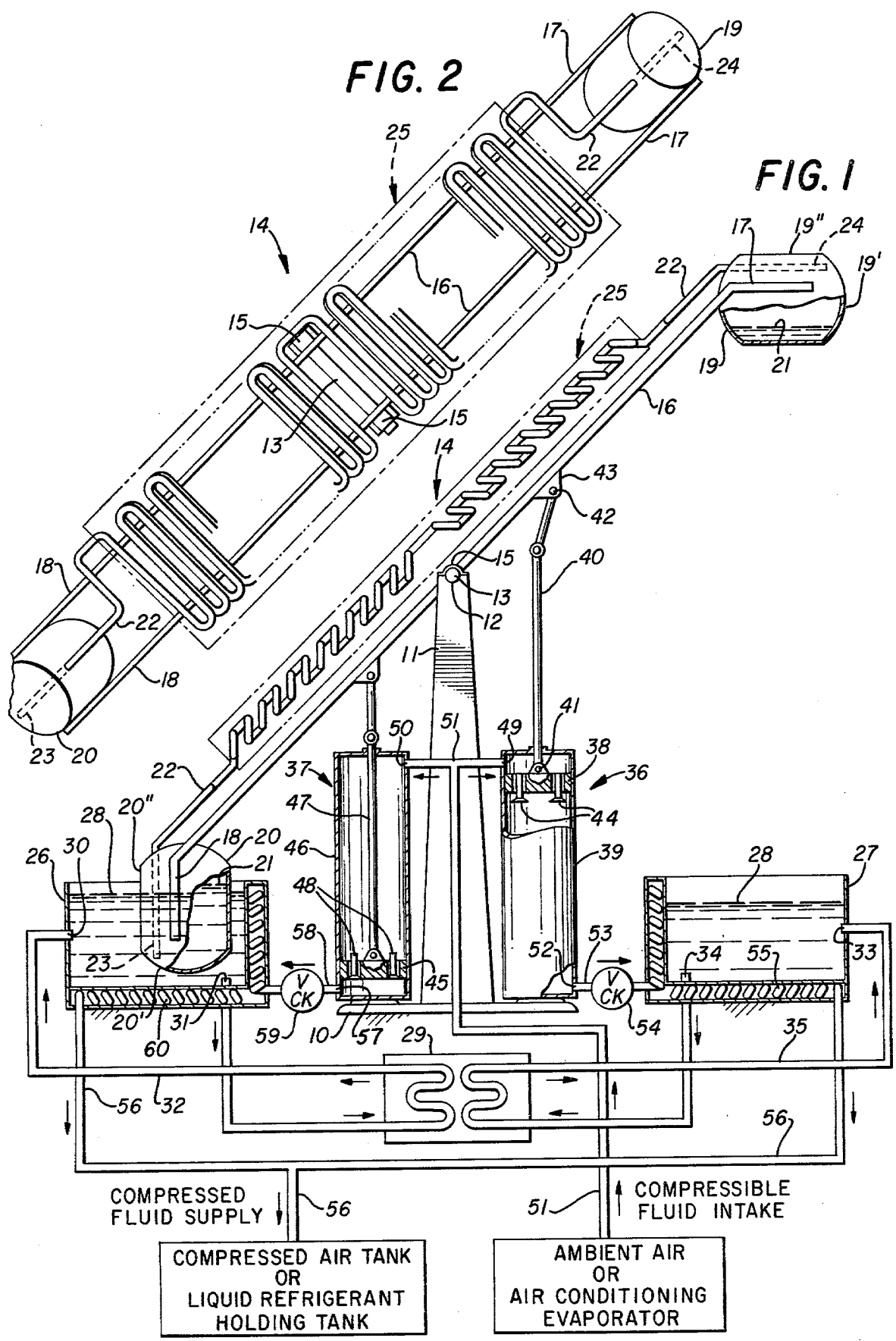

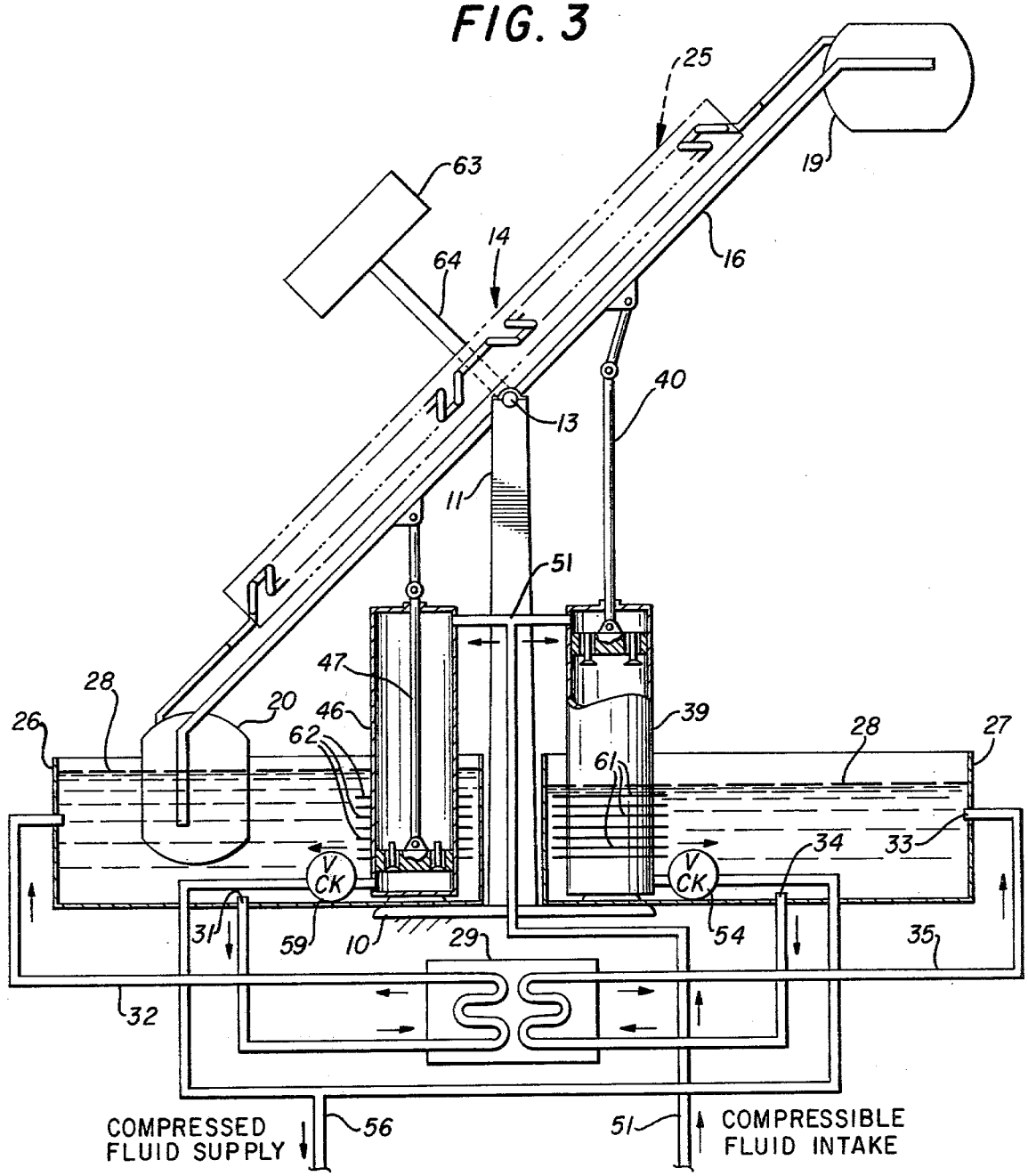

LOW-BOILING LIQUID APPARATUS

This invention relates in general to thermodynamic motors, and in particular, to motors employing low-boiling liquid in a closed system, including tanks at opposite ends of a centrally pivotable arm and a fluid interconnecting path between tanks, with an imparted temperature differential means between tanks causing the fluid to transfer alternately between the tanks, creating mechanical unbalance which imparts a see-saw motion to the arm. The rocking motion of the arm may then be used as a mechanical power source.

The operating principle of motors of the above type has long been known in the art and motors and mechanisms exploiting the principle have long existed in the art. The operating principle has been implemented into motors or mechanical drive mechanisms of two general types; those operating on a rotating wheel basis, and those operating on a "see-saw" basis. In either type of implementation, mechanical unbalance imparted by repetitive transfer of low-boiling liquid beween tank-pairs provides a torque giving rise to motion, i.e., the wheel rotates, or an arm is caused to pivot back and forth (see-saw).

Early teachings relating to "wheel" type thermodynamic motors are found in U.S. Pat. Nos. Iske 256,482 (circa 1882) and 389,515 (circa 1888), which provide a wheel-like structure carrying plural opposed-pairs of interconnected fluid tanks. In more recent times, the wheel-type motor principle, employing solar energy as a power source has been publicized (see "Wally Minto's Wonder Wheel", Popular Science, March 1976, page 79). In recognizing that commerical feasibility of such types of motors depends on efficiency of heat exchange, U.S. Pat. No. Avery 3,509,716 teaches placement of absorbent material coating on fluid tanks to enhance temperature differential between tanks by evaporative cooling principles.

"See-saw" implementations of the general operating principle of thermodynamic motors are typified by teachings of U.S. Pat. No. 755,048 to Russell (circa 1904) where the pivoting motion alternately closes each of a pair of lamp switches, the heat generated by the lamps providing the necessary temperature differential for operation. Further known prior art teachings related to "see-saw" implementation are found in Milano (Italian Patent No. 422085) and Lorphelin (French Patent No. 992,936).

From the above teachings it is apparent that, while the operating principle of thermodynamic motors is not new, patented implementations employing the principle have not been entirely successful in attaining commercial feasiblilty. Operation of thermodynamic motors of the above-described and referenced types may generally be stated to be feasible to the extent that an economically attained temperature differential is established and efficient utilization of that temperature differential is realized.

It is, therefore, a principle object of this invention to provide an improved thermodynamic motor towards optimizing power output and efficiency.

Another object is to provide such a thermodynamic motor wherein heat generated by work done by the motor is utilized to enhance the system temperature differential.

A further object for such a motor is to provide heat exchange means which enhances temperature differential between fluids in respective interconnected fluid tanks to thereby accelerate fluid transfer cycles.

Features of this invention useful in accomplishing the above objects include, in a thermodynamic motor of the "see-saw" type, water tank means into which opposed ones of low boiling-point liquid contained in interconnected tanks are cyclically immersed. The tank water is maintained at a higher than ambient temperature level by a primary heat source which may comprise a solar collector or other source. Heat exchange means are incorporated in the interconnection between tanks to enhance temperature differential between liquid quantities in the respective tanks, with the reciprocating pivot motion of the tank mounting arm connecting-rod-interconnected to a piston-type fluid compressor. A source of fluid thereby compressed is carried through check valve means and heat-exchanging means immersed in the water tanks, with the heat of compression thereby utilized to raise the water temperature and enhance the temperature differential between the water and ambient air to accelerate low-boiling liquid transfer between the motor liquid carrying tanks. In an alternate embodiment, fluid compressing cylinder means carries plural radially extending vanes and is immersed in the water tank to facilitate heat-of-compression transfer into the water.

Specific embodiments representing what are presently regarded as the best mode of carrying out this invention are illustrated in the accompanying drawings.

In the drawings:

FIG. 1 represents a diagrammatic side elevation view of a first embodiment of a thermodynamic motor with heat exchange enhancement;

FIG. 2, a top view of the low boiling liquid tank mounting arm and liquid interconnect between tanks; and FIG. 3, a diagrammatic side elevation view of an alternate embodiment with water tank immersed fluid compression cylinders.

Referring to the drawings:

The thermodynamic motor driven fluid compressor of FIG. 1 is shown as comprising a motor base mount means 10 from which a pair of fulcrum support members 11 extend (one fulcurm support member 11 shown in the elevation view of FIG. 1). Annular seats 12 formed in the top extreme of the support members 11 provide a bearing surface support for a pivot shaft 13 of a motor pivot arm assembly 14 with upper bearing brackets 15 completing pivot supports for shaft 13 of arm assembly 14.

As best seen in FIG. 2, the motor pivot arm assembly 14 comprises a pair of parallel-disposed, longitudinally extending arms 16 to which pivot shaft 13 is centrally affixed. End extremes 17 and 18 of each of arms 16 are angled from the longitudinal axes of the arms 16 and affixed, as by welding, to opposite sides of respective liquid holding tanks 19 and 20 which are spherically end-capped cylinders. Tanks 19 and 20 contain a quantity of low boiling-point liquid 21 such as freon or propane, and fluid interconnection between tanks 19 and 20 is provided by a fluid line 22, with one line-end 23 carried into the confines of tank 20 and the other line-end 24 carried into the confines of tank 19. The fluid interconnect line 22 is extended through a heat exchanger 25 which is affixed to arm assembly 14 symetrically with respect to the assembly pivot shaft 13. As shown in FIG. 1, the ends 23 and 24 of fluid line 22 extend within the respective liquid holding tanks into proximity with the tank extremes 20' and 19' and are disposed parallel to side wall extremes 20" and 19".

As seen in FIG. 1, a pair of water tanks 26 and 27 are fixed-mounted with respect to the pivot arm assembly mounting base 10, each positioned to receive an associated one of liquid holding tanks 20 and 19 when that liquid holding tank is carried to a low-position extreme. Each of tanks 26 and 27 holds a volume of water 28 into which a low-extreme positioned one of the liquid holding tanks is immersed, such as liquid tank 20 of FIG. 1. The supply of water 28 in the respective water tanks 26 and 27 is heated to above ambient temperature by a primary heat source 29, which might comprise a solar collector or other source; water in tank 26 being continuously circulated via respective input and output ports 30 and 31 of line 32 which is coiled through the heat source 29, and water in tank 27 being circulated via respective input and output ports 33 and 34 of line 35 which is coiled through heat source 29.

As thus-far described, the apparatus of FIGS. 1-2 operates to impart a rocking or "see-saw" motion to the arm assembly 14. With the arm assembly positioned as in FIG. 1, liquid holding tank 20 is immersed in the warmer than ambient temperature water 28 in water tank 26, whereupon the low boiling liquid 21 in tank 20 vaporizes, forcing the liquid 21 through connecting line 22 and heat exchanger 25 into the upper-positioned tank 19, with heat exchanger 25 providing a desirous temperature differential between liquid leaving lower tank 20 and that entering upper tank 19. The weight of the liquid transferred into upper tank 19, operating through its lever arm with respect to pivot shaft 13 of pivot arm assembly 14, imparts a clockwise torque unbalance (as viewed in FIG. 1) which forces tank 19 to drop down and be immersed in water tank 27, while the tank 20 is withdrawn from water tank 26 into the lower ambient temperature of surrounding air; whereupon the process repeats, with low boiling liquid in immersed tank 19 vaporizing to force liquid back into the raised tank 20, etc. Arm assembly 14 then is driven in a see-saw manner through power provided by alternate weight transfer of the low boiling liquid between holding tanks.

As shown in FIG. 1, the rocking motion of pivot arm assembly 14 is utilized to drive the pistons of a pair of fluid compressors 36 and 37 of the cylinder-piston type. Compressor 36 is shown as comprising a piston 38 driven within cylinder 39 by drive motion of connecting rod 40, rod 40 being pivotably connected to piston 38 via pin 41, and to pivot arm assembly 14 via pin 42 and pin receptacle 43 affixed to assembly 14. Piston 38 is provided with intake valves 44. Likewise, compresor 37 comprises a piston 45 driven within cylinder 46 via connecting rod 47 which is pivotably connected to piston 45 and to pivot arm assembly 14 on the opposite side of the arm assembly pivot shaft 13. Piston 45 is provided with intake valves 48. Each of the compressor cylinders 39 and 46 is fixed mounted to the base plate 10. Respective intake ports 49 and 50 of cylinders 39 and 46 communicate with a common compressible fluid intake line 51. Output port 52 of cylinder 39 communicates via line 53 and check valve 54, and through a heat exchanger 55 carried within water tank 27, to a common compressed fluid output line 56; while output port 57 of cylinder 46 communicates via line 58 and check valve 59, and through a heat exchanger 60 carried within water tank 26, to the common compressed fluid output line 56.

In operation, the see-saw drive motion of the pivot arm assembly 14 is imparted via cylinder connecting rods 40 and 47 to up-stroke and down-stroke motion of the compressor pistons 38 and 45, one piston being on up-stroke while the other is on down-stroke. During up-stroke, compressible fluid from intake line 51 drawn into the cylinders and, during down-stroke, hot compressed fluid is delivered through the check valves and an associated water tank immersed heat exchanger to the output line 56, with the heat of compression being exchanged into the water tanks to aid in raising the temperature differential between the water and ambient surrounding, thus advantageously enhancing the temperature differential necessary to operate the thermodynamic prime mover of the system.

The apparatus of FIG. 1 might be usable as an air compressor, with the compressible fluid intake line 51 communicating with ambient air, and the compressed fluid supply line 56 inputted to a compressed air holding tank. Alternatively, intake line 51 might supply refrigerant from the evaporator of an air conditioner, with the output supply line 56 delivering liquid refrigerant to a holding tank of the air conditioner system; with, in either usage, the heat of compression transferred into the prime mover water tanks to enhance the thermodynamic motor temperature differential.

Referring now to FIG. 3, a further embodiment of the apparatus comprises a structure essentially like that of FIG. 1, with corresponding elements identified by like reference numerals. In FIG. 3, the air compressor cylinders 39 and 46 are seen to be immersed in the associated water tanks 27 and 26. In lieu of the heat exchangers 55 and 60 of FIG. 1, cylinder 39 carries a plurality of heat exchanging vanes 61 about the lower portion thereof where compression heat is concentrated, with vanes 61 providing heat exchange to enhance the temperature of the water in tank 27, and thus the temperature differential. Cylinder 46 likewise carries a plurality of heat exchanging vanes 62 about the lower portion thereof to provide compression heat exchange and enhance the temperature of the water in tank 26.

The embodiment of FIG. 3 is additionally depicted as including a weight member 63 which may be rigidly affixed to the pivot shaft 13 of the motor pivot arm assembly 14 by means of mounting arm means 64 which extends normal to the plane of arms 16 of the pivot arm assembly 14. Weight member 63, symetically disposed about pivot arm assembly 14, advantageously provides enhancement of the mechanical unbalance imparted by liquid transfer between tanks 19 and 20 as the heavier one of the liquid holding tanks passes beyond the halfway point of its downward travel, providing a more positive and rapid down-stroke of the compressor pistons on respective compression cycles. The weight 63, and the mass center displacement of weight 63 from pivot axis 13, would be selected such that the increasing torque provided by the upper fluid tank into which fluid is transferred would overcome the counter-torque imposed by weight 63 prior to level position of the pivot arm assembly where the weight 63 imposes zero torque.

In either of the embodiments described herein, the efficiency is enhanced by heat exchanging means which contribute to temperature differential upon which the thermodynamic prime move depends for operation. Low-boiling liquid is more rapidly transferred from the water immersed tank to the elevated tank by means of heat exchanger 25 in the fluid transfer line between fluid tanks 19 and 20. The thermodynamic motor means is used to power fluid compressors, with the heat of compression advantageously transferred to the water tanks to enhance the differential between the water temperature and that of ambient air.

Whereas this invention is herein illustrated with respect to particular embodiments thereof, it should be realized that various changes may be made without departing from essential contribution to the art made by the teachings hereof.

I claim:

1. A thermodynamic motor powered fluid compression apparatus, comprising a centrally pivotable arm member, liquid holding tank means affixed to respective opposite end extremes of said arm member, a fluid communication means extending between said liquid holding tank means, with said tank means and fluid communication means comprising a closed system, a low-boiling liquid supply contained in said closed system, first and second water holding tank means into which respective ones of said liquid holding tank means are immersible by pivot action of said arm member; fluid compression means, drive means connected between said pivotable arm member and said fluid compression means, and heat exchanging means communicating with said fluid compression means and said water holding tank means whereby heat of compression is transferred into said water holding tank means.

2. The apparatus of claim 1, wherein said fluid communication means comprises a fluid conduit means with respective ends extended through and into juxtaposition with end extremes of respective ones of said liquid holding tank means, and a further heat exchanging means connected between said conduit means ends and in communication with ambient atmosphere.

3. The apparatus of claim 2, with means for heating the water in said water holding tanks to a temperature in excess of the temperature of said ambient atmosphere.

4. The apparatus of claim 3, with said fluid compression means comprising first and second piston-cylinder type fluid compressors, said drive means comprising respective connecting rods pivotably connected to said pivotable arm member on respective opposite sides of the pivot axis of said arm member and to respective ones of fluid compressor pistons, each said fluid compressor having a compressible fluid intake means and a compressed fluid outlet means.

5. The apparatus of claim 4, with said heat exchanging means comprising first and second heat exchangers immersed in respective ones of said first and second water holding tank means, and each said compressed fluid outlet means connected through one of said first and second heat exchangers to a compressed fluid output line.

6. The apparatus of claim 5, with each of said fluid compressor compressible fluid intake means connected to a common input line means, and each of said fluid compressor compressed fluid output lines connected to a common output line means.

7. The apparatus of claim 6, with said common input line communicating with ambient air, and said common output line communicating with a compressed air holding tank.

8. The apparatus of claim 6, with said common input line communicating with the evaporator of an air conditioning unit, and said common output line communicating with a liquid refrigerant holding tank of said air conditioning unit.

9. The apparatus of claim 4, with said first and second fluid compressors immersed in respective ones of said water holding tank means, and with said heat exchanging means comprising the respective compressor cylinder walls in contact with the water in respective ones of said water holding tank means.

10. The apparatus of claim 9, with each said fluid compressor cylinder having a plurality of heat conductive vane members extending from at least that portion of said cylinder where heat of compression is concentrated.

11. The apparatus of claim 10, with each of said fluid compressor compressible fluid intake means connected to a common input line means, and each of said fluid compressor compressed fluid output lines connected to a common output line means.

12. The apparatus of claim 11, with said common input line communicating with ambient air, and said common output line communicating with a compressed air holding tank.

13. The apparatus of claim 11, with said common input line communicating with the evaporator of an air conditioning unit, and said common output line communicating with a liquid refrigerant holding tank of said air conditioning unit.

14. The apparatus of claim 4, further comprising a mass member, means for affixing said mass member above the pivot axis of said pivot arm member and symmetrically with respect to said pivot arm member, with the mass center of said mass member lying on a line normal to said pivot axis, said mass member imparting a torque of sense like that imparted by the lower-positioned one of said liquid holding tank means.

* * * * *